Sept. 6, 1932.  B. L. QUARNSTROM  1,875,885

TUBE CONNECTION

Filed Sept. 9, 1929

INVENTOR
Bert L. Quarnstrom.
BY
Stuart C. Barnes
ATTORNEY

Patented Sept. 6, 1932

1,875,885

UNITED STATES PATENT OFFICE

BERT L. QUARNSTROM, OF GROSSE POINTE PARK, MICHIGAN, ASSIGNOR TO BUNDY TUBING COMPANY, OF DETROIT, MICHIGAN, A CORPORATION OF MICHIGAN

TUBE CONNECTION

Application filed September 9, 1929. Serial No. 391,121.

There are a number of different ways by means of which the end of a tube is secured to another element in fluid conducting relation; the element referred to may be any one of a number of different devices such as engines, fuel tanks, oil reservoirs or the like, or another tube. The particular tube referred to is one usually rather small in cross section, examples of which are the tubes used for gasoline lines, oil lines, vacuum lines and radiator overflow tubes on automotive vehicles.

The present invention is concerned particularly with a tube connection of the flared type, wherein the end of the tube is flared outwardly and arranged to be engaged between two fittings in such a manner that the flared portion is clamped between the fittings to form a tight seal. Difficulties have been experienced with this type of connection due to the fact that the flaring of the end of the tube weakens the stock so that it is liable to break at or near the connection. Some materials of which the tube may be made withstand this better than others: for example, if a brass tube is flared, the stock is materially weakened and the end of the flare oft times split, while copper more readily withstands this flaring. Accordingly, a copper tube with this type of connection is more desirable but the copper is more expensive than the brass and this is objectionable. In any event there is some weakening of the tube when it is flared, regardless of the material of which it is made, and the brass tube has been cited as exemplary only.

The invention contemplates an improved construction for a flared connection wherein the tube although flared, is not weakened but is in reality strengthened. The construction contemplated, is useful with tubes made of different materials whether of brass, copper, or of steel. The tubes may be of various types, such as seamless or of the Bundy type. The construction accordingly, makes possible the use of a tube constructed of material which does not readily withstand the flaring and accordingly, in some instances cheaper tubes can be used, although the construction will strengthen any tube.

More particularly, the invention resides in the provision of an additional element designed to be located at the end of the tube and secured thereto. This additional element takes the form of a ferrule which preferably is of a construction so as to engage both the exterior and interior walls near the end of the tube and this ferrule is located at the point of flaring. The ferrule design may vary somewhat depending upon the desired strength at the end of the tube adjacent the connection, and the manner in which the ferrule is applied to the tube may vary somewhat in order to meet particular conditions. These features are depicted in the accompanying drawing wherein:

Figure 1:
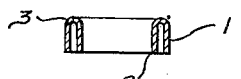
Fig. 1 is a sectional view taken through a ferrule which may be employed in carrying out the invention.
Figure 2:
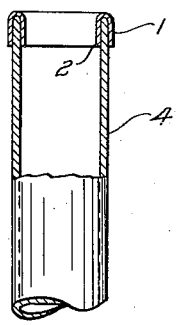
Fig. 2 is a view of the end of the tube, partly in section, illustrating the ferrule applied thereto.
Figure 3:
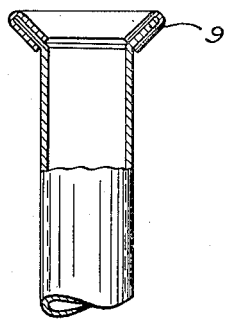
Fig. 3 is a view similar to that of Fig. 2 illustrating how the end of the tube and ferrule are flared.
Figure 5:
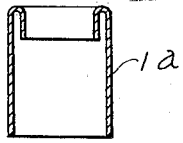
Figure 6:
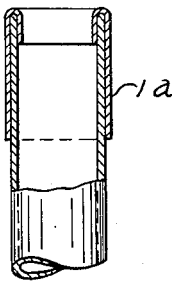
Figure 7:
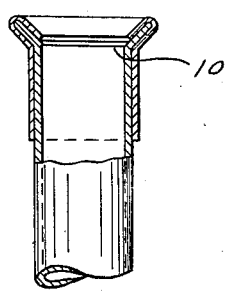

Figs. 5, 6, and 7 are similar respectively to Figs. 1, 2 and 3, illustrating a varied type of ferrule.

Figure 8:
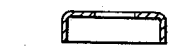
Figure 9:
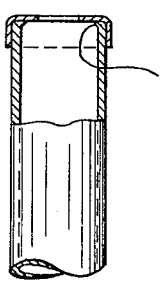
Figure 10:
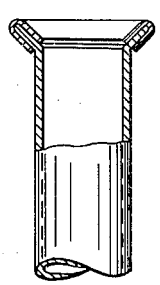

Figs. 8, 9 and 10 are also views similar to Figs. 1, 2 and 3, illustrating a modified manner in which the flare may be applied in order to meet a particular condition.

Figure 11:
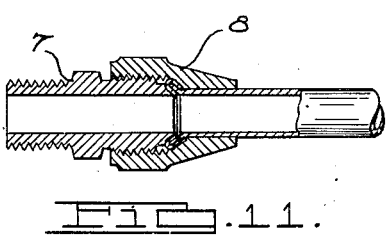

Fig. 11 is a sectional view taken through a coupling showing the coupling parts.

The ferrule may be made of any desirable material such as copper which is capable of withstanding the flaring operation without splitting or breaking. As shown in Fig. 1, the ferrule is in the form of a ring, U shape in cross section, having an exterior leg 1 and an interior leg 2 and a bight portion 3. The tube is illustrated at 4. In securing the ferrule to the tube it may be placed over the end of the tube after the manner shown in Fig. 2 with the bight portion of the ferrule substantially abutting against the end of the tube. The ferrule is strongly affixed to the tube as by means of molten sealing metal such as solder, copper or an alloy, or it may be affixed to the tube by welding the two metals together. The ferrule may be secured to the tube while in the condition shown in Fig. 2 before being flared, or after it is flared, although it is thought to be preferable to secure the ferrule strongly to the end of the tube before flaring. Fig. 3 shows the tube and ferrule in flared condition.

Figure 4:
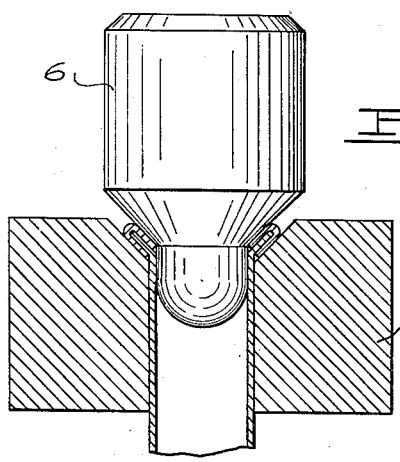
Fig. 4 illustrates a punch and die mechanism which may be employed in flaring the tube.

The flare may be effected by any suitable means or method and a simple way of accomplishing this is by utilizing a die 5 and punch 6, in which the tube with the attached ferrule is placed and the punch and die are brought together under pressure to effect the flare as illustrated in Fig. 4.

A complete connection is shown in Fig. 11 wherein a fitting in the form of a plug 7, which may be termed the male fitting, has a screw threaded engagement with nut 8, which may be termed the female fitting. The fittings have cooperating slanting faces which engage opposite sides of the flared ferrule so that when the fittings are drawn tightly together, a fluid tight connection is obtained. The fitting 7 may be secured to any desirable device or element as above pointed out, or another tube and female fitting member may be attached thereto.

In the event that the material of which the tube is made does not withstand readily the flaring operation, the stock will be liable to split near the extreme end of the flared portion of the tube or substantially at the point indicated by the reference character 9. This, however, does not in any way destroy or render ineffective the connection which later may be made, because the split ends are confined within the ferrule in fluid tight manner by the solder or other sealing metal.

It is within the invention to put the ferrule on the tube without using molten sealing metal, as by pressing the same in place. By providing a pressed fit, a fluid tight joint between the tube and ferrule may also be effected.

In some instances it may be desirable due to the particularly heavy duty required of the tube, either from the standpoint of internal or external pressure, or due to the fact that the tube in its mounting is subjected to vibrations or the like, or due to arbitrary requirements of a user or manufacturer, to further re-enforce the end of the tube against the possibility of breakage. In this event a ferrule shown in Figs. 5, 6, and 7 may be employed wherein the exterior leg of the U as illustrated at 1a may have considerable length so as to inclose an appreciable portion of the tube adjacent the flared end thereof. When the tube is flared there is a weakening of the tube at the point of bend as indicated substantially by the reference character 10: this is especially true with some of the less ductile materials of which the tube may be made. The ferrule shown in Figs. 5, 6, and 7 extends well beyond this point of bend, however, and forms a re-enforcement therefor.

The ferrule may be applied to the end of the tube in such manner as to accommodate for particular conditions and such an application as illustrated in Figs. 8, 9, and 10. When tubes are made up in continuous lengths and are then cut into shorter lengths by the means of any suitable cutting tool, there is generally a burr thrown up as illustrated at 11. As shown therein, the burr is on the inside of the tube although there might also be a burr on the outside. This would interfere with the placing of the ferrule on the end of the tube. However, the ferrule may be applied thereto by placing the ferrule thereon while the same is in the form of what may be termed a disk as illustrated in Fig. 8, the manner of application being shown in Fig. 9. The tube and ferrule may now be placed in the die and the action of the punch is such as to substantially simultaneously throw the leg 2 of the ferrule downwardly against the inside surface of the tube, and effect the flared formation of the tube end and ferrule. Thus the burr is tightly enclosed and in effect compressed between the legs of the ferrule. In flaring the end of the tube, when the ferrule is thus applied, the ferrule may be secured to the end of the tube by the molten sealing metal before the inner leg has been thrown down and the flare effected after. If the seaming operation is performed while the tube and ferrule are in the relative positions illustrated in Fig. 9 such connection largely resides between the end portion of the tube and the outside leg of the ferrule. This, however, will provide for an effectively tight seal.

Claims:

1. For connection between two fittings or the like which are adapted to be drawn together axially and which have cooperating surfaces similarly inclined as regards the axial center of the fittings, a tube having the wall portions of an end thereof flared outwardly, a ferrule U shaped in cross section fitting over the end of the tube, one leg of the ferrule lying against the inside of the flared wall portion, and the other leg lying against the outside of the flared wall portion with said legs relatively tightly gripping the flared portion, the extreme end of the tube substantially abutting the bight portion of the U shaped ferrule, the angle of the flared wall portion of the tube and the legs of the ferrule substantially corresponding to the angle of the cooperating surfaces of the fittings, and said flared wall portion and ferrule being adapted to be engaged between said cooperating surfaces of the fittings as the fittings are drawn together axially for coupling.

2. For connection between two fittings or the like which are adapted to be drawn together axially and which have cooperating surfaces similarly inclined as regards the axial center of the fittings, a tube having the wall portions of an end thereof flared outwardly, a ferrule U shaped in cross section fitting over the end of the tube, one leg of the ferrule lying against the inside of the flared wall portion, and the other leg lying against the outside of the flared wall portion with said legs relatively tightly gripping the flared portion, the outside leg of the U shaped ferrule extending beyond the flared end of the tube and embracing a portion of the normal tube wall whereby to strengthen the tube wall at the intersection of the flared portion with the normal tube wall, the extreme end of the tube substantially abutting the bight portion of the U shaped ferrule, the angle of the flared wall portion of the tube and the legs of the ferrule around the same substantially corresponding to the angle of the cooperating surfaces of the fittings and said flared wall portion and the legs of the ferrule around the same being adapted to be engaged between said cooperating surfaces on the fitting.

3. For connection between two fittings or the like which are adapted to be drawn together axially and which have cooperating surfaces similarly inclined as regards the axial center of the fittings, a tube having the wall portions of an end thereof flared outwardly, a ferrule U shaped in cross section fitting over the end of the tube, one leg of the ferrule lying against the inside of the flared wall portion, and the other leg lying against the outside of the flared wall portion with said legs relatively tightly gripping the flared portion, the extreme end of the tube substantially abutting the bight portion of the U shaped ferrule, the angle of the flared wall portion of the tube and the legs of the ferrule substantially corresponding to the angle of the cooperating surfaces of the fittings, said ferrule and flared end portion of the tube being sealed together by molten sealing metal.

In testimony whereof I affix my signature.

BERT L. QUARNSTROM.